June 24, 1958   G. W. FINDLEY ET AL   2,840,418
TRACTOR WHEEL SPACING MEANS
Filed Sept. 30, 1953   2 Sheets-Sheet 1
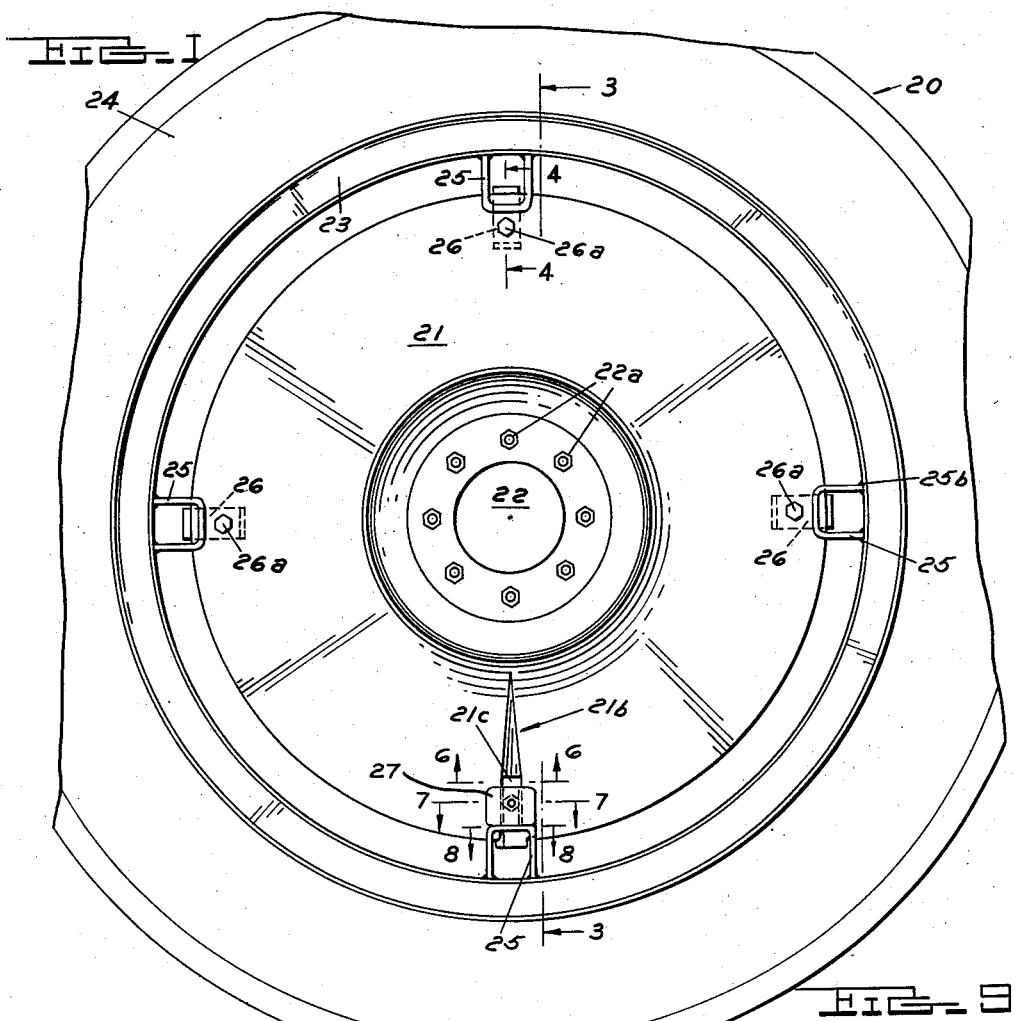
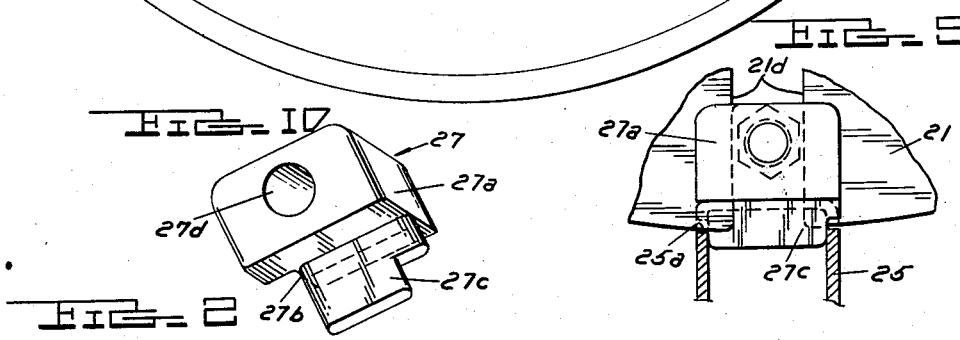
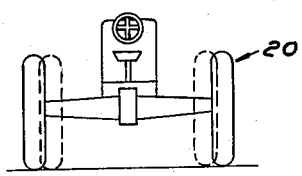
INVENTORS
GEORGE W. FINDLEY
ANDREW A. BLAAUW
BY E. C. McRae
E. R. Faulkner
W. A. Schaich
ATTORNEYS

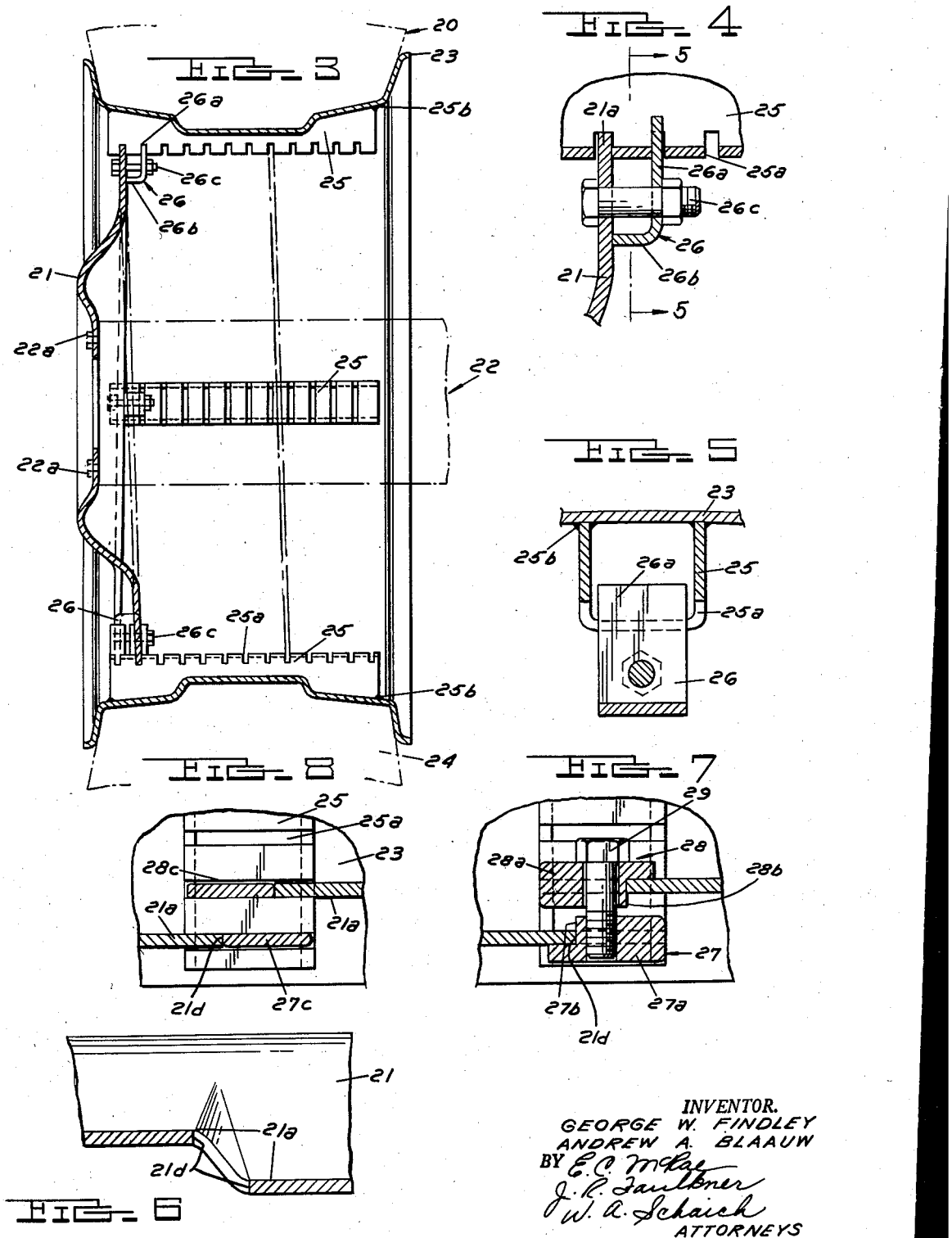

United States Patent Office 2,840,418
Patented June 24, 1958

2,840,418

TRACTOR WHEEL SPACING MEANS

George W. Findley and Andrew Blaauw, Birmingham, Mich., assignors to Ford Motor Company, Dearborn, Mich., a corporation of Delaware Application September 30, 1953, Serial No. 383,262

2 Claims. (Cl. 301—9)

This invention relates to vehicles having adjustably spaceable ground wheels. In a more specific aspect this invention relates to a novel wheel assembly wherein the rim and hub are laterally shiftable with respect to each other. In a still further aspect this invention relates to a novel wheel assembly wherein the rim and hub may be laterally shifted with respect to each other by rotating said parts relative to each other.

Self-propelled vehicles such as tractors and the like are employed extensively for a variety of farm operations including the cultivation of various crops. As each crop is desirably planted at a selected row spacing for most effective growth and most efficient land utilization, it is requisite that the wheels of the tractor be adjustably spaceable to travel between the plant rows.

It is therefore an important object of the present invention to provide adjustably spaceable vehicle wheels for vehicles such as farm tractors and the like. A further object of the present invention is to provide adjustably spaceable tractor wheels wherein adjustment of said wheels is effected by rotating the hubs and rims of said wheels relative to each other.

A still further object of the present invention is to provide adjustably spaceable tractor wheels wherein adjustment is effected by rotating the hubs relative to the rims of said wheels by means of engine power.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side view of an adjustable vehicle wheel made in accordance with the present invention.

Figure 2 is a reduced scale rear view of a farm tractor fitted with a pair of rear wheels made in accordance with the present invention and illustrating the extent of adjustability of said wheels.

Figure 3 is a section view taken along the plane 3—3 of Figure 1.

Figure 4 is a section view taken along the plane 4—4 of Figure 1.

Figure 5 is a section view taken along the plane 5—5 of Figure 1.

Figure 6 is a section view taken along the plane 6—6 of Figure 1.

Figure 7 is a section view taken along the plane 7—7 of Figure 1.

Figure 8 is a section view taken along the plane 8—8 of Figure 1.

Figure 9 is an enlarged fragmentary view of the "master" lock mechanism shown in Figure 1, with parts broken away in section to show the manner in which portions of the "master" lock fit into slots formed in the rim guide elements.

Figure 10 is a perspective view of a "master" lock casting.

As shown on the drawings:

Numeral 20 refers generally to a vehicle wheel having a disk-shaped hub 21 detachably secured to a vehicle axle 22 by means of a circle of bolts 22a. Wheel 20 also includes an annular rim part 23 having a pneumatic tire 24 mounted thereon.

As best shown in Figure 3 and as also shown in Figures 1 and 6, hub 21 comprises a steel disk of particular configuration. The circumferential portion 21a of hub 21 is formed as a helix; or said circumferential portion may be described as defining one thread of a large machine screw. As best shown in Figure 6 and as indicated at 21b in Figure 1, the circumferential portion 21a of hub 21 is provided with a rectangularly shaped notch 21c, formed at the so called "pitch width" of helix 21a. Notch 21c is of suitable width to receive the shank of a bolt 29 in a manner to be later described. The helical circumference 21a of hub 21 coacts with rim 23 to provide adjustability in accordance with practice of the present invention.

As shown in Figures 1 and 3, the rim 23 has a series of four guide elements 25 secured to the inside thereof as by welding, indicated at 25b. Guides 25 are secured transversely of the plane of rim 23 and are fabricated of generally U-shaped steel stock having their arm portions contoured to conform to the inside surface of rim 23. Guides 25 are provided with series of axially spaced slots 25a in their bight portions which are adapted to receive the helical portion 21a of hub 21 in threadable relation. The spacing of slots 25a relative to each other corresponds to the pitch of the helical circumference 21a of hub 21. Slots 25a are also spaced relative to the ends of guides 25 in such manner that when guides 25 are assembled to rim 23, said slots define a continuous helical path adapted to receive hub 21 in a threadable relation.

It will be obvious from the foregoing description that when rim 23 and hub 21 are rotated relative to each other, said elements will be shifted axially with respect to each other in a direction determined by the direction of relative rotation of said parts. Thus, as shown in Figure 2, an adjusted spacing of a pair of wheels attached to a common vehicle axle can be readily affected.

To retain rim 21 and axle 23 in an operatively fixed relation for propelling a vehicle, once a desired tread width of the wheels has been established, a locking mechanism is provided. As shown in Figures 1, 4 and 5, a series of three "slave" locks 26 and a "master" lock 27—28 make up the complete locking mechanism to secure rim 23 and hub 21 in fixed relation. The "slave" locks 26 comprise an L-shaped metal bracket of material somewhat thinner than the width of slots 25a. One arm 26a of bracket 26 is adapted to fit into a slot 25a and the end of the other arm 26b is adapted to bear against the body of hub 21. Bracket 26 and hub 21 are apertured to receive a bolt 26c for clamping said parts together (Figure 4). When bolt 26c is tightened, lock 26 will be tightly clamped against hub 21, and the periphery 21a of hub 21 will be tightly clamped against the side wall of slot 25a, as will the arm 26a of lock 26. The other two "slave" locks 26 are locked in the manner just described.

A "master" lock 27—28 is employed to lock the terminal ends of the helical portion 21a of hub 21 to a guide element 25, best shown in Figures 1 and 7. "Master" lock 27—28 is comprised of two castings 27 and 28 which are mirror images of each other. Casting 27 is illustrated in perspective view in Figure 10 and comprises a body part 27a having a shouldered portion 27b adapted to abut a face 21d, Figure 6, of hub portion 21a. Casting 27 also has a depending lug portion 27c aligned with face 27b and adapted to fit within a slot 25a and depend below the bottom thereof to bear against a side of a guide 25. As illustrated in Figure 7, casting 28 is a mirror image of casting 27 and provides an oppositely directed thrust surface 28b. Castings 27 and 28 are provided with aligned bores 27d and 28d. Bore 27d is threaded to receive the thread of a bolt 29 and bore 28d is smooth and adapted to receive the shank of bolt 29. When castings 27 and 28 are applied to guides 25 and hub surface 21d as described, and bolt 29 is applied and tightened, a lock unit is formed which provides bi-directional resistance to displacement of hub 21 and rim 23. When the "master" lock and three "slave" locks are applied as described, disk 21 and rim 23 are fixed against rotary displacement relative to each other.

It will of course be obvious that several methods can be used to rotate rim 23 and hub 21 relative to each other to provide an adjusted wheel spacing in accordance with the present invention. The simplest method comprises removing the "slave" and "master" locks to free the wheel parts for relative rotation. The opposite tractor wheel is then locked by means of its brake, and engine power is applied to axle 22 to turn hub 21. Since the weight of the vehicle is supported on the wheel assembly 20, the tire 24 will have a tendency to remain stationary while hub 21 turns. Of course as hub 21 turns, rim 23 will be shifted laterally. Since the parts are of sufficient strength, the side thrust is harmlessly absorbed and rim 23 and tire 24 are skidded into position while supporting the vehicle.

Since the hub slots 21c must be positioned over a guide 25, as illustrated in Figure 1, final alignment of "master" lock 27—28 and a selected guide 25 can be effected as follows: When slot 21c has been brought into approximate alignment with a guide 25, a casting 27 or 28, depending upon the direction of rotation of disk 21, is placed in a slot 25a and disk 21 is further rotated until surfaces 21d and 27b contact each other. The "master" and "slave" locks are then assembled as described and the wheel assembly is locked into a "unit." Of course, it will be obvious that the guide elements 25 can be suitably indexed for convenience in selecting a desired wheel spacing.

Thus the present invention provides an adjustable vehicle wheel of improved simplified construction over related structures provided by the prior art. Advantages inherent in the present structure include improved ease of adjustment, a simplified structure and a wide range of increments of adjustment, represented by one-fourth of the pitch of helical hub portion 21a.

It will, of course, be understood that various details of construction may be varied through a wide range without departing from the principles of this invention and it is, therefore, not the purpose to limit the patent granted hereon otherwise than necessitated by the scope of the appended claims.

We claim:
1. In a vehicle wheel, a disk-like body part having its circumference formed as a single turn helix, the ends of said helix terminating in radially extending and axially spaced thrust surfaces, a rim part, and means for operatively mounting said rim part on said body part in rotatable and axially shiftable relation thereto, said means comprising a series of guide elements secured on said rim part and disposed transversely of the plane of said rim part, said guide elements being respectively provided with a series of spaced slots adapted to threadably receive the circumferential helix portion of said body part to thereby permit adjustment of said rim part to different positions laterally of said body part upon relative rotation of said body part and said rim part, and a releasable lock operative to secure said body part and said rim against rotary displacement relative to each other, said lock comprising a pair of box-like body parts, said body parts being respectively provided with oppositely directed thrust surfaces adapted to abut said thrust surfaces of said helix, and lug portions extending from said body parts and adapted to fit within said slots of said guide elements, and means for securing said lock in clamping engagement with said thrust surfaces and said slots.

2. In a vehicle wheel, a disk-like body part having its circumference formed as a single turn helix, the ends of said helix terminating in radially extending and axially spaced thrust surfaces, a rim part, and means for operatively mounting said rim part on said body part in rotatable and axially shiftable relation thereto, said means comprising a series of guide elements secured on said rim part and disposed transversely of the plane of said rim part, each of said guide elements being provided with a series of spaced slots, the slots of the elements lying along the path of a helix and being adapted to threadably receive the circumferential helix portion of said body part to thereby permit adjustment of said rim part to different positions laterally of said body part upon relative rotation of said body part and said rim part, and a releasable lock operative to secure said body part and said rim against rotary displacement relative to each other, said lock having oppositely directed thrust surfaces adapted to abut the thrust surfaces of the helix and a portion projecting beyond the helix of the body part and adapted to engage one of said guide elements for preventing relative rotation of the rim part and body part, and means for supporting the lock.

References Cited in the file of this patent
UNITED STATES PATENTS

| | | |
|---|---|---|
| 2,417,139 | Strehlow | Mar. 11, 1947 |
| 2,432,385 | Court | Dec. 9, 1947 |
| 2,682,430 | Brubaker | June 29, 1954 |
| 2,693,392 | Grosch | Nov. 2, 1954 |
| 2,755,138 | Brink | July 17, 1956 |

FOREIGN PATENTS

| | | |
|---|---|---|
| 811,786 | Germany | Aug. 23, 1951 |